(12) United States Patent
Lyons

(10) Patent No.: US 10,457,198 B2
(45) Date of Patent: Oct. 29, 2019

(54) ACCESSORY MOUNTING SYSTEM

(71) Applicant: Whelen Engineering Company, Inc., Chester, CT (US)

(72) Inventor: Jon H. Lyons, Haddam, CT (US)

(73) Assignee: Whelen Engineering Company, Inc., Chester, CT (US)

(*) Notice: Subject to any disclaimer, the term of this patent is extended or adjusted under 35 U.S.C. 154(b) by 152 days.

(21) Appl. No.: 15/470,276

(22) Filed: Mar. 27, 2017

(65) Prior Publication Data

US 2018/0272926 A1 Sep. 27, 2018

(51) Int. Cl.
*B60Q 1/26* (2006.01)
*F21S 43/19* (2018.01)
*F21S 43/14* (2018.01)

(52) U.S. Cl.
CPC ......... *B60Q 1/2615* (2013.01); *B60Q 1/2696* (2013.01); *F21S 43/19* (2018.01); *F21S 43/14* (2018.01)

(58) Field of Classification Search
CPC F21V 17/18; F21V 17/08; B60Q 1/26; B60Q 1/2696
See application file for complete search history.

(56) References Cited

U.S. PATENT DOCUMENTS

| | | | | |
|---|---|---|---|---|
| 5,573,326 A | * | 11/1996 | Iijima | B60Q 1/0683 362/273 |
| 5,908,239 A | * | 6/1999 | Sugimoto | B60Q 1/0683 362/421 |
| 6,637,919 B2 | * | 10/2003 | Shirai | B60Q 1/0683 362/515 |
| 6,641,284 B2 | | 11/2003 | Stopa et al. | |
| 6,845,893 B2 | | 1/2005 | Nelson | |
| 7,404,658 B1 | | 7/2008 | Lyons et al. | |
| 7,517,120 B2 | | 4/2009 | Smith | |
| 7,611,270 B1 | | 11/2009 | Lyons et al. | |
| 7,712,931 B1 | | 5/2010 | Smith | |
| 8,833,993 B1 | | 9/2014 | Lyons | |
| 9,459,436 B2 | | 10/2016 | Smith | |
| 2003/0117810 A1 | | 6/2003 | Nakazawa et al. | |
| 2010/0110708 A1 | | 5/2010 | Lyons et al. | |

(Continued)

OTHER PUBLICATIONS

International Search Report and Written Opinion dated Jun. 21, 2018 (PCT/US2018/024245).

*Primary Examiner* — William N Harris
(74) *Attorney, Agent, or Firm* — Alix, Yale & Ristas, LLP

(57) ABSTRACT

According to aspects of the disclosure, the system comprises a frame mounted in sealed relation to a surface. The frame includes movable engagement features and surfaces that mate with an accessory body. A gasket positioned between the frame and a mounting surface seals the space between the frame and the mounting surface from surrounding external elements. The frame may be fastened to the mounting surface with tool-free rivet fasteners, or more conventional threaded fasteners. The assembled accessory body and bezel fit over the frame and the movable engagement features of the frame mate with complementary structures on the accessory body to fix the accessory body to the frame. Openings in the accessory body allow a threaded fastener to secure the movable engagement feature of the frame in the mated position, preventing unintentional disengagement of the accessory body.

19 Claims, 8 Drawing Sheets

(56) References Cited

U.S. PATENT DOCUMENTS

| | | | |
|---|---|---|---|
| 2013/0235575 A1* | 9/2013 | Tsao | F21V 17/08 362/235 |
| 2014/0153274 A1 | 6/2014 | Shibata et al. | |
| 2016/0052801 A1 | 2/2016 | Kruger et al. | |

* cited by examiner

ACCESSORY MOUNTING SYSTEM

BACKGROUND

The present disclosure relates to systems for mounting accessories to motor vehicles. More specifically, the disclosure relates to a system for mounting light-generating assemblies referred to as lightheads to motor vehicles.

Lightheads for motor vehicles typically include a housing, light source, electrical circuitry, and connections to vehicle power and control devices for actuating the lighthead. A lighthead may be used on motor vehicles including vehicles deployed for law enforcement and emergency response, such as the warning lights on ambulances, fire engines and police vehicles. When used as a warning light, a lighthead must comply with various regulations and standards while also being able to function reliably when exposed to potentially damaging environmental conditions, including hot and cold temperature extremes, sunlight, moisture, dust, dirt and various chemicals such as ice melting compounds. Prior art lightheads have employed threaded fasteners to retain housing components to each other and to secure the lighthead to a motor vehicle. In some cases, the same fastener may perform the function of securing housing components to each other and securing the lighthead to a motor vehicle. The fastener may pass through the light emitting (outward-facing) surface of the lighthead, thereby reducing the light-emitting surface area of the lighthead and detracting from the aesthetic appearance of the product. Threaded fasteners may also interfere with automated assembly of the products.

There is a need in the art for lighthead configurations that reduce the number of threaded fasteners needed to assemble and mount a lighthead to a motor vehicle, while maintaining function, durability and appearance of the product.

SUMMARY OF THE DISCLOSURE

In the illustrated embodiment, an accessory mounting system (hereinafter, "system") is disclosed. An accessory body encompasses and supports the portion of the system that is operational after the system has been assembled and mounted, one such accessory body being a lighthead. The disclosed system minimizes the number of fasteners necessary to assemble and mount the lighthead to a surface, while enhancing the aesthetic appearance of the lighthead. The disclosed structures may facilitate automated assembly of the lighthead. The disclosed system is also backward compatible with older mounting systems.

According to aspects of the disclosure, the system comprises a frame mounted in sealed relation to a surface, which may be an exterior body panel of a motor vehicle. The frame includes movable engagement features and surfaces that mate with an accessory body such as a lighthead. A gasket positioned between the frame and a mounting surface seals the space between the frame and the mounting surface from the surrounding environment. The frame may be fastened to the mounting surface with tool-free rivet fasteners, or more conventional threaded fasteners. A bezel surrounds the periphery of the lighthead to provide a finished appearance when the lighthead is secured to the frame. The bezel and lighthead are constructed to snap together, with the bezel retained behind the lighthead. The bezel functions as a trim around the lighthead, which allows different shapes and finishes to be selected to customize the appearance of the accessory. The assembled lighthead and bezel fit over the frame and the movable engagement features of the frame mate with complementary structures on the lighthead to fix the lighthead to the frame. The bezel, lighthead and frame are constructed with aligned openings, permitting a fastener to pass through the bezel and lighthead to secure the movable engagement feature of the frame in its mated position. The lighthead cannot be disengaged from the frame without first removing the fastener, preventing unintentional disengagement of the lighthead. In the disclosed embodiment, one threaded fastener is installed through each end of the bezel and lighthead. The fasteners extend through the sides of the assembly and do not interrupt the front, light-emitting face of the lighthead.

In the disclosed embodiment, the frame includes a base having a peripheral edge, at least one movable latch integral to the frame which includes a boss defining a fastener-receiving opening. The latch is moveable between a projected and a retracted position. The periphery of the lighthead includes hooks integral to the lighthead configured to mate with the movable latch. A screw extends through an opening defined by the lighthead (accessory body), is received by the opening in the boss and holds the latch in the projected (latched) position.

In an alternate embodiment, the position of the latch and the hook may be reversed such that the frame includes at least one hook integral to the frame and the accessory body (lighthead) includes at least one latch integral to the accessory body configured to mate with the at least one hook of the frame.

DETAILED DESCRIPTION

Figure 1:
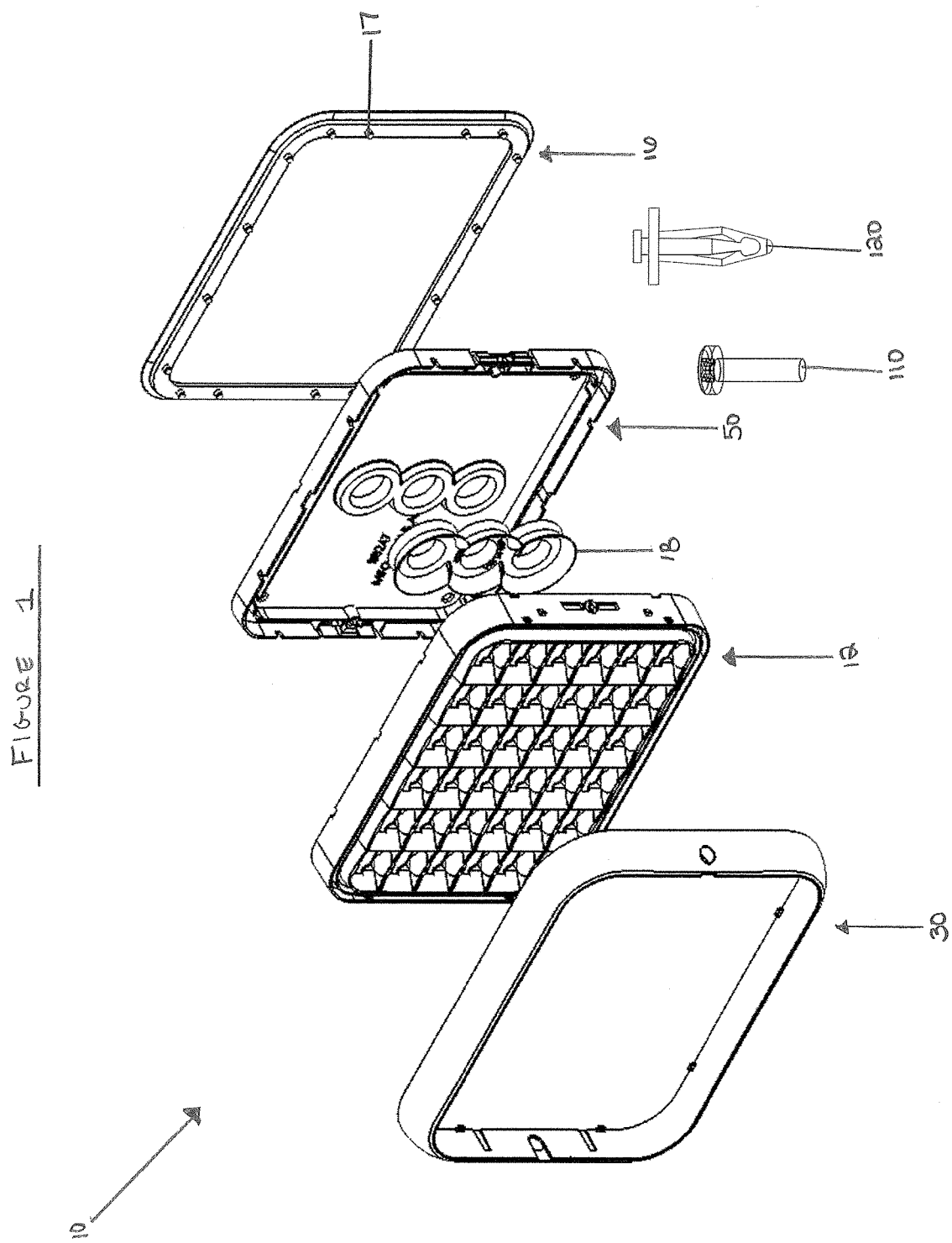
FIG. 1 shows an exploded perspective view of one disclosed embodiment of a system according to aspects of the disclosure.

An embodiment of an accessory mounting system according to aspects of the disclosure will now be described with reference to FIGS. 1-8, wherein like numerals represent like parts. The disclosed embodiment of a mounting system will generally be referred to by the reference numeral 10. Various materials, methods of construction, methods of manufacture, and methods of fastening will be discussed in the context of the disclosed embodiment. Those skilled in the art will recognize known substitutes for the materials, manufacturing methods, and fastening methods, all of which are contemplated as compatible with the disclosed embodiment and are intended to be encompassed by the appended claims.

Figure 2:
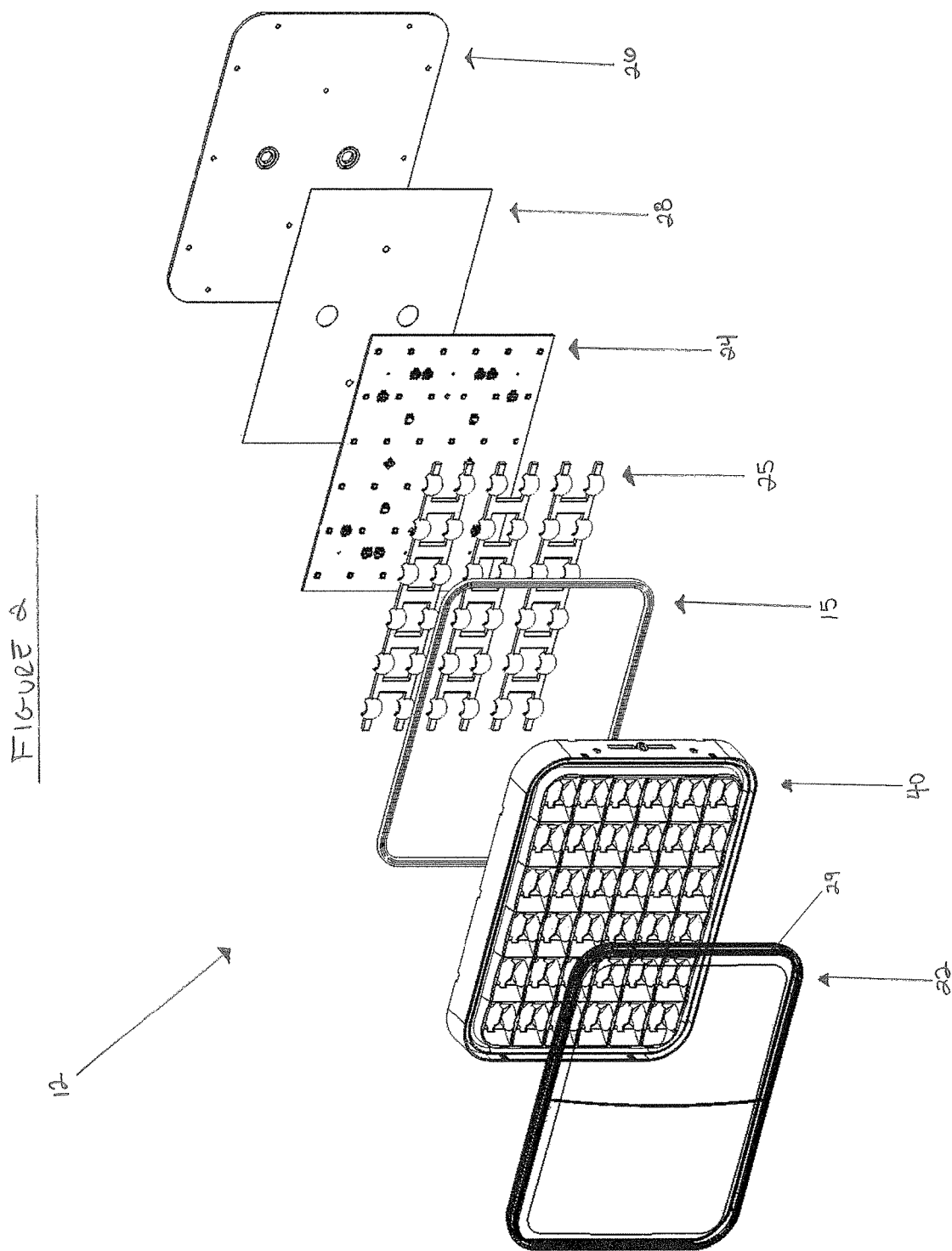
FIG. 2 shows an exploded perspective view with particular emphasis on an accessory body from the system shown in FIG. 1.

As shown in FIG. 1, an embodiment of the disclosed mounting system 10 includes a lighthead 12, a bezel 30, a frame 50 and a rear gasket 16. As shown in FIG. 2, the lighthead 12 is an assembly including a lens 22, a reflector 40, a lighthead seal 15, a printed circuit (PC) board 24, groups of collimators 25, LEDs, a co-therm gasket 28 and a heat sink 26. The periphery of the reflector 40 defines the outside features of the lighthead 12 and may be referred to as an "accessory body." Fasteners extend through the heat sink 26, co-therm gasket 28 and PC board 24 and are received in openings in the back side of the reflector 40. The reflector 40 retains the seal 15 and groups of collimators 25 against the heat sink 26 and PC board 24, respectively. The lens 22 includes a lip 29 that is received in a complementary channel defined by the front of the reflector 40. The lens 22 and reflector 40 are configured with features that snap together to retain the lens 22 to the reflector 40. Adhesive sealant may be placed in the channel to seal the lens 22 to the reflector 40.

In the disclosed embodiment, the bezel 30, reflector 40, frame, 50 and lens 22 are molded plastic components. Plastic materials are selected to have the properties suitable to the function of each component. As such, the lens 22 may be light transmissive polycarbonate treated for UV resistance. The frame 50 and bezel 30 may be glass fiber reinforced with nylon. The reflector 40 may also be polycarbonate and have reflecting surfaces that are polished and metalized.

Figure 4:
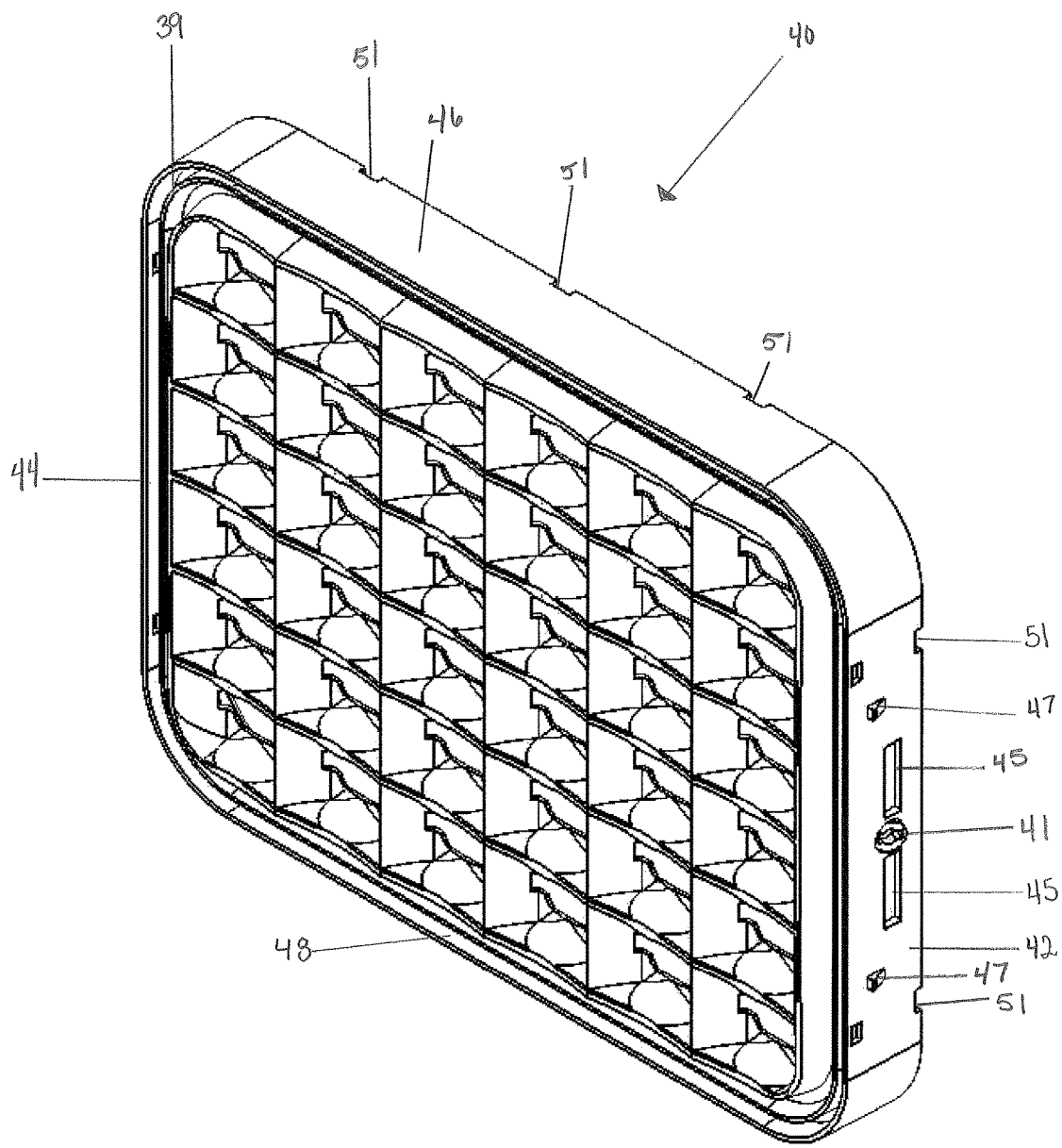
FIG. 4 shows a perspective view with particular emphasis on a reflector from the system shown in FIG. 1.
Figure 5:
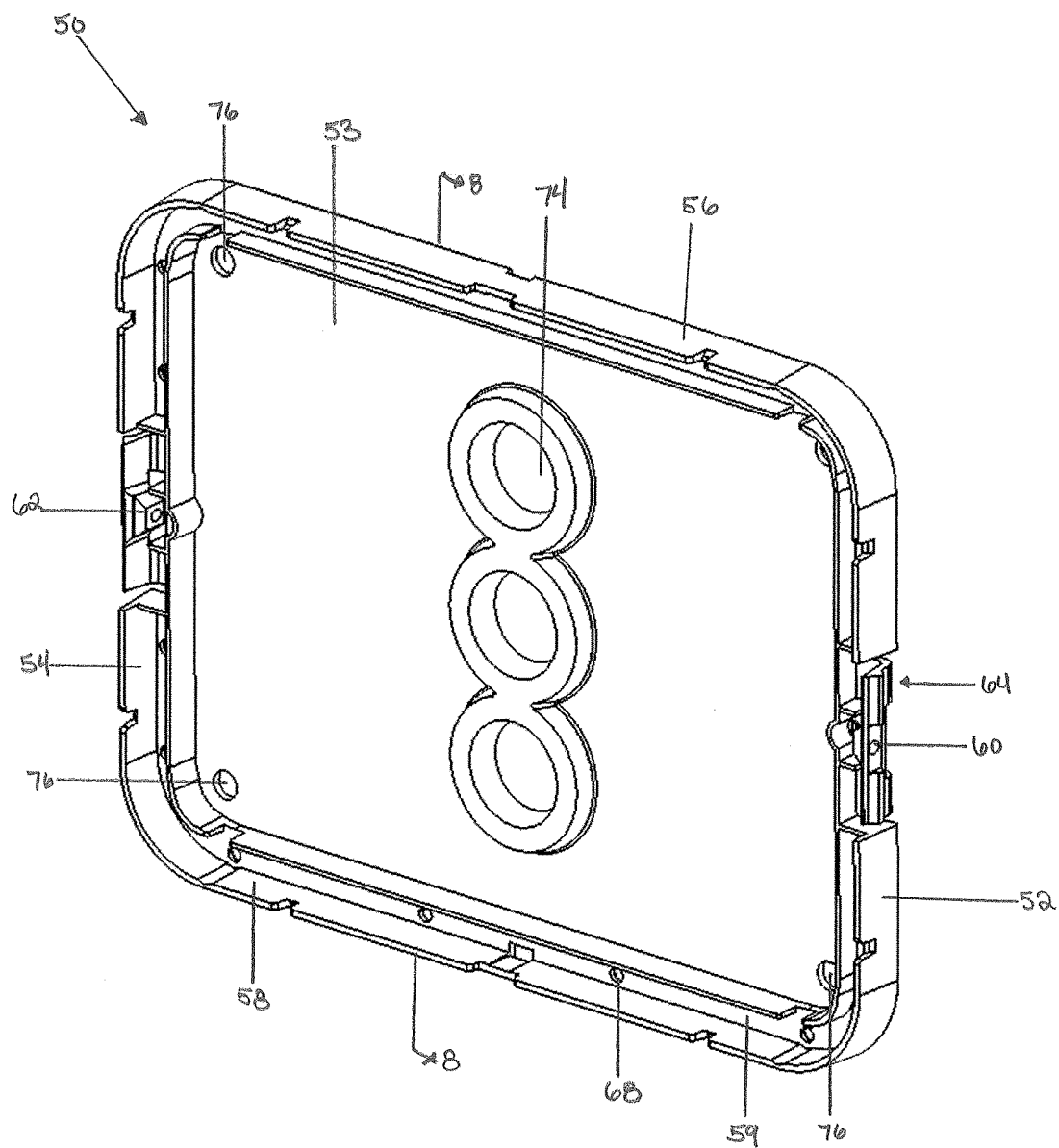
FIG. 5 shows a perspective view with particular emphasis on a frame from the system shown in FIG. 1.
Figure 7:
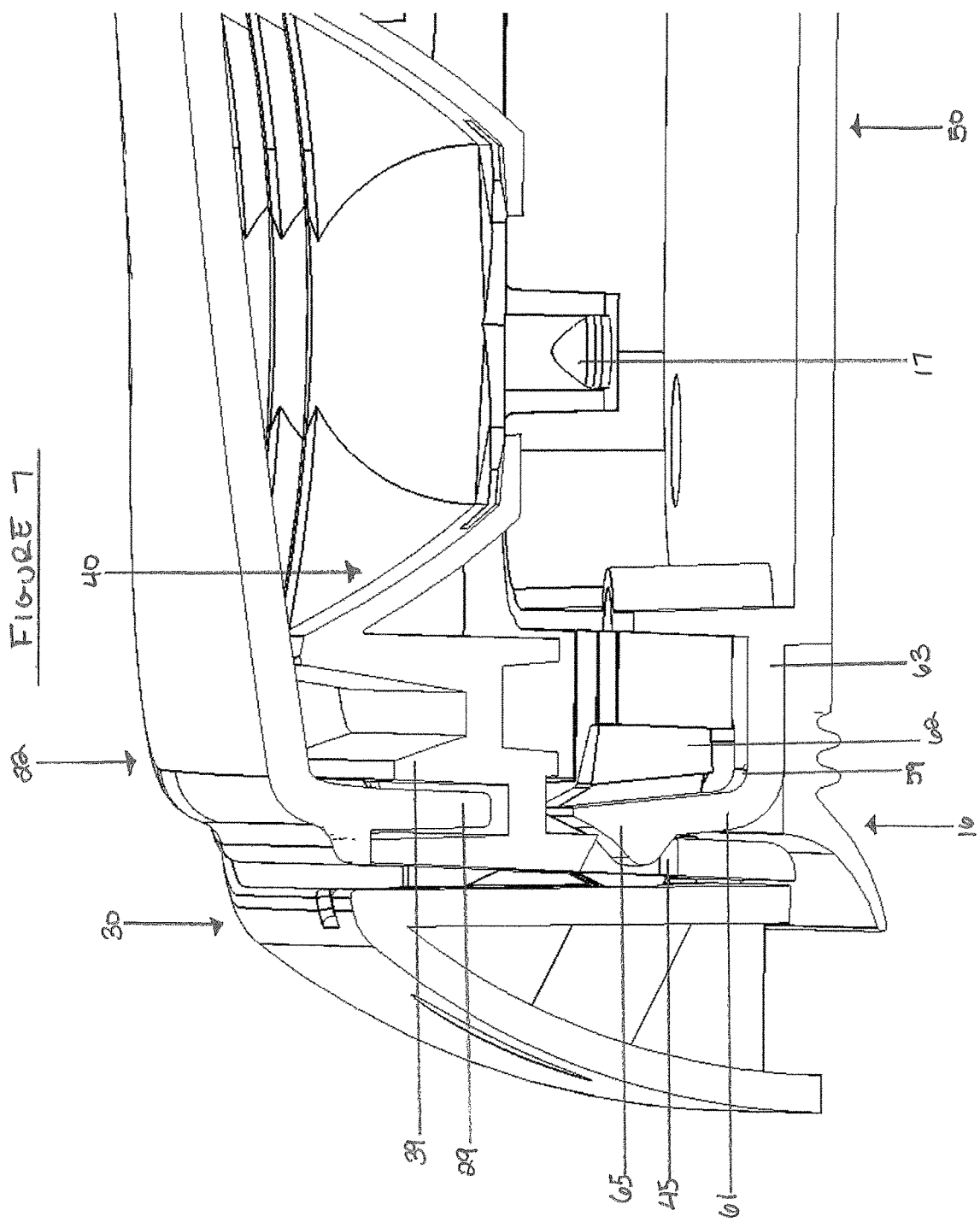
FIG. 7 shows a top cross-sectional view through the system shown in FIG. 6, omitting components and features of the accessory body for clarity, taken along line 7-7 thereof.
Figure 8:
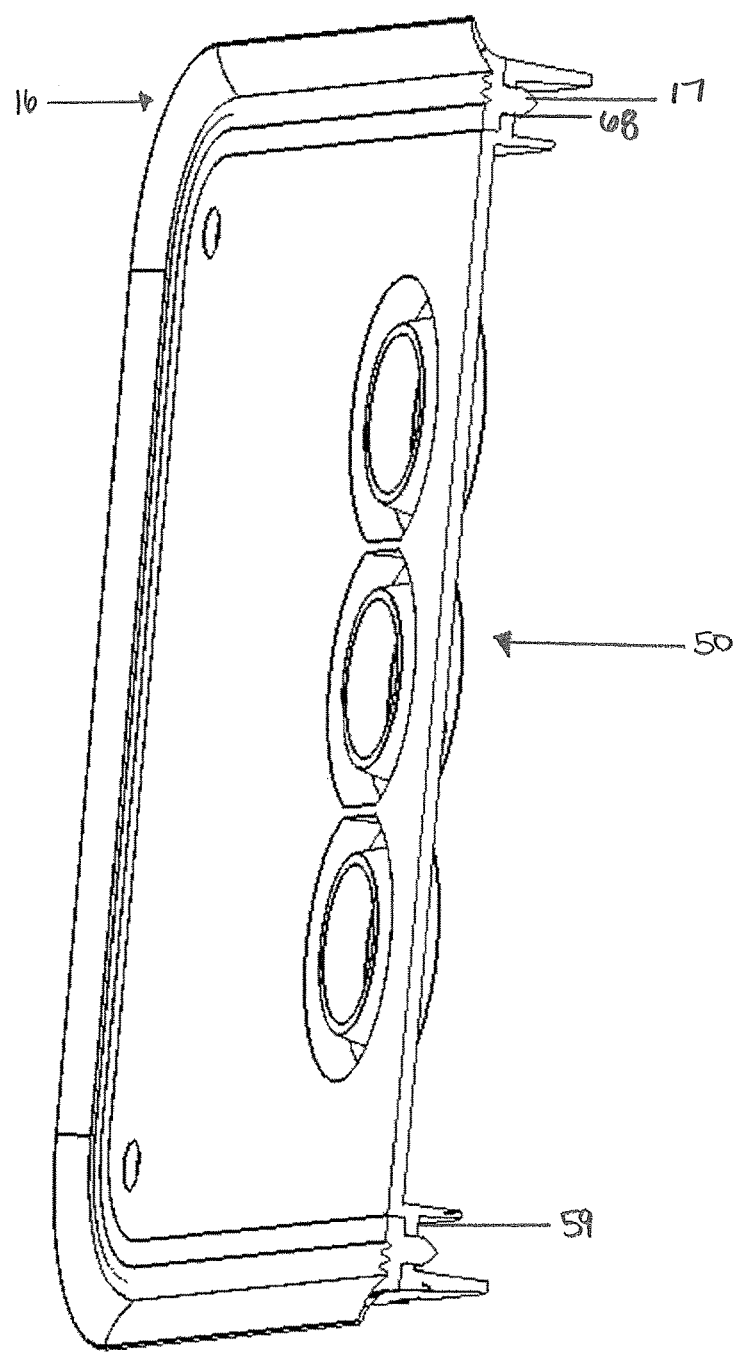
FIG. 8 shows a rear perspective cross-sectional view through the frame of FIG. 5, with a rear gasket shown behind the frame, taken along line 8-8 thereof.

As shown in FIGS. 5, 7 and 8, the frame 50 is a rectangular panel with rounded corners having identical opposing short sides 52, 54 and identical opposing long sides 56, 58. The frame 50 includes a base 53, a peripheral edge, an interior edge and an inner track 59 running between the peripheral and interior edges. A series of cutouts extend through the peripheral and interior edges for the drainage of moisture. Each short side 52, 54 includes a pair of latches 64 projecting outward from the inner track 59 for engaging the reflector 40. Each latch 64 includes an arm 61 originating at a root 63 integral to the frame 50 and adjacent the inner track 59 and a barb 65 adjacent an outer end of the arms 61. Each barb 65 includes a ramped surface and a rounded point to facilitate disengagement of the latches 64 from the reflector 40. The latches 64 are connected by a fastener-receiving boss 62 defining an opening 60 centered between the pair of latches 64. An arcuate groove extends rearward of each fastener-receiving boss 62 to allow room for a fastener. A plurality of holes 68 extend through the base 53 of the frame 50 in the inner track 59 for receiving alignment projections 17 from the rear gasket 16. Three wiring openings 74 extend through a middle portion of the base 53. A wiring opening gasket 18 positioned between the frame 50 and the accessory body (lighthead 12) seals the wiring openings 74 in the space between the frame 50 and the accessory body (lighthead 12). Four mounting holes 76 are offset from the wiring openings As shown in FIGS. 4 and 7, the reflector 40 is a rectangular structure with rounded corners having identical opposing short sides 42, 44 and identical opposing long sides 46, 48. An inner rim 39 surrounds a perimeter of a front side of the reflector 40. A keyhole-shaped opening 41 for receiving a fastener or a tool extends through each short side 42, 44. Each keyhole-shaped opening 41 is located in the center of each short side 42, 44 to align with the opening 60 defined by the fastener-receiving boss 62 of the frame 50. Each keyhole-shaped opening 41 is positioned between a pair of hooks 45 for engaging the latches 64 of the frame 50. In the disclosed embodiment, each hook 45 is a slot extending to either side of the keyhole-shaped opening 41. Ramps 47 are offset from each hook 45 and form part of a snap connection between the bezel 30 and the reflector 40. A series of rearward facing recesses 51 are defined on the rear edge of each short side 42, 44 and each long side 46, 48. These recesses 51 receive mating tabs 37 on the bezel 30.

Figure 3:
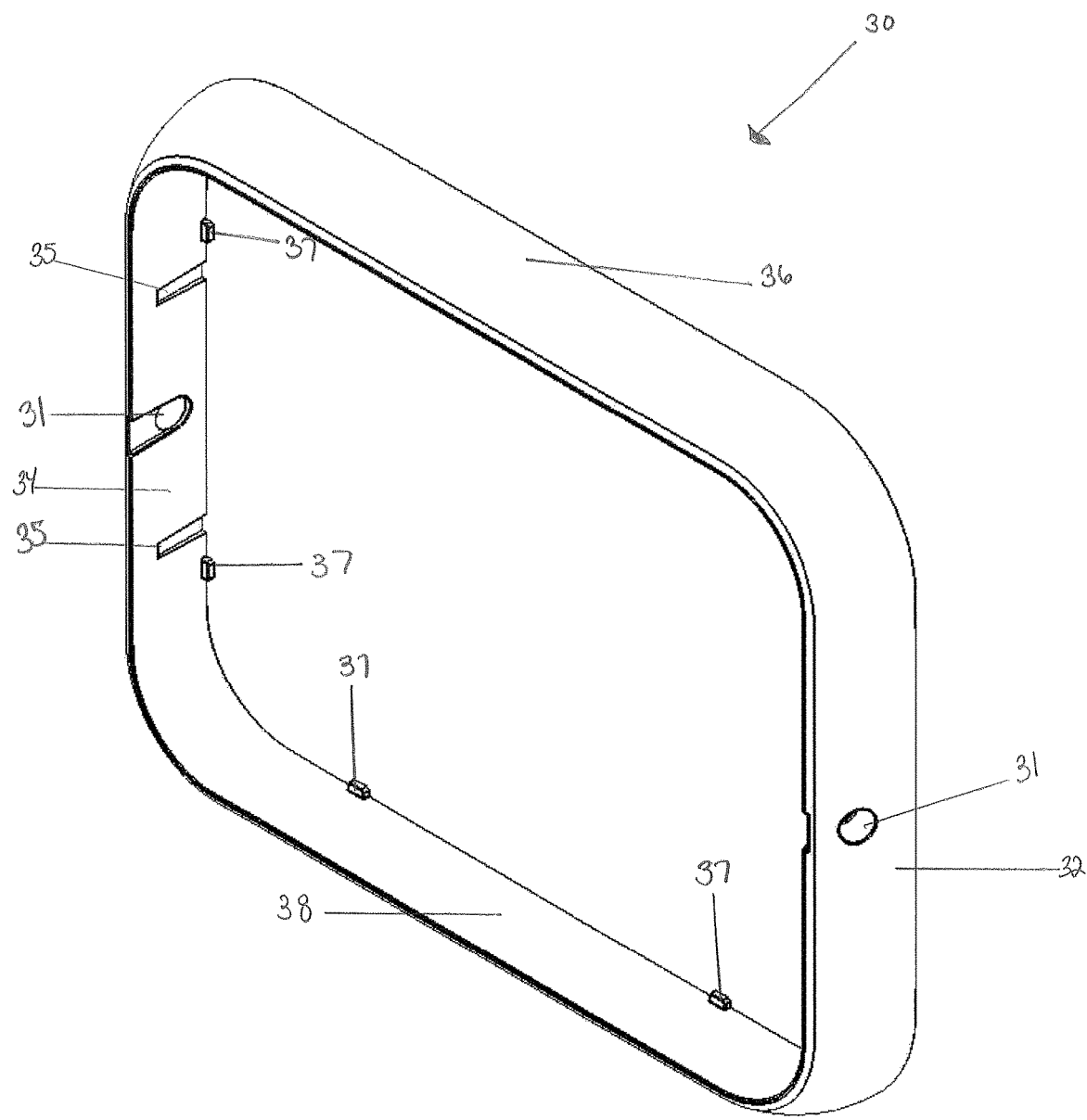
FIG. 3 shows a perspective view with particular emphasis on a bezel from the system shown in FIG. 1.

As shown in FIG. 3, the bezel 30 is a rectangular outer structure with rounded corners having identical opposing short sides 32, 34 and identical opposing long sides 36, 38. An opening 31 for receiving a fastener extends through the each short side 32, 34 to an interior. Each opening 31 is located in the center of each short side 32, 34. Each opening 31 is intermediate a pair of ledges 35 on the interior for attaching to the reflector 40. A series of tabs 37, also for attaching to the reflector 40, project inward from a rear edge of each short side 32, 34 and each long side 36, 38. The bezel 30 is configured to snap over the reflector 40 when the bezel is pushed onto the reflector 40 from the rear of the reflector 40. The ramps 47 deflect the short sides 32, 34 of the bezel 30 away from the reflector until the ramps 47 mate with the ledges 35 inside the bezel 30. With the bezel ledges 35 mated with the reflector ramps 47 and the bezel tabs 37 received in the reflector recesses 51, the bezel 30 is retained to the reflector 40 in a reversible, snap-fit relationship. The bezel 30 can only be disengaged from the lighthead 12 in a rearward direction, preventing disengagement of the bezel 30 when the lighthead 12 is installed to the frame 50.

As shown in FIGS. 1, 7 and 8, the rear gasket 16 is made of silicone, or another compatible material, includes the plurality of alignment projections 17 on a top surface and a wipe seal projecting from a bottom surface. The rear gasket 16 is retained between the frame 50 and a mounting surface 100 shown in FIG. 6. As shown in FIG. 8, the plurality of projections 17 extend through the plurality of holes 68 of the frame 50. The frame 50 is tightly mounted to the surface 100 with four rivet fasteners 120 (shown in FIG. 1). The rivet fasteners 120 are inserted through the mounting holes 76 and fasten through openings the mounting surface 100, establishing a seal between the frame 50 and the mounting surface 100. In the disclosed embodiment, the mounting surface 100 is a vertical panel of a motor vehicle, but other surfaces are compatible. Electrical wires from the vehicle extend through the wiring openings 74 to connect with corresponding wires (not shown) projecting from the PC board 24. Water-tight electrical connectors connect the lighthead 12 to the vehicle electrical system in a manner known in the art.

Figure 6:
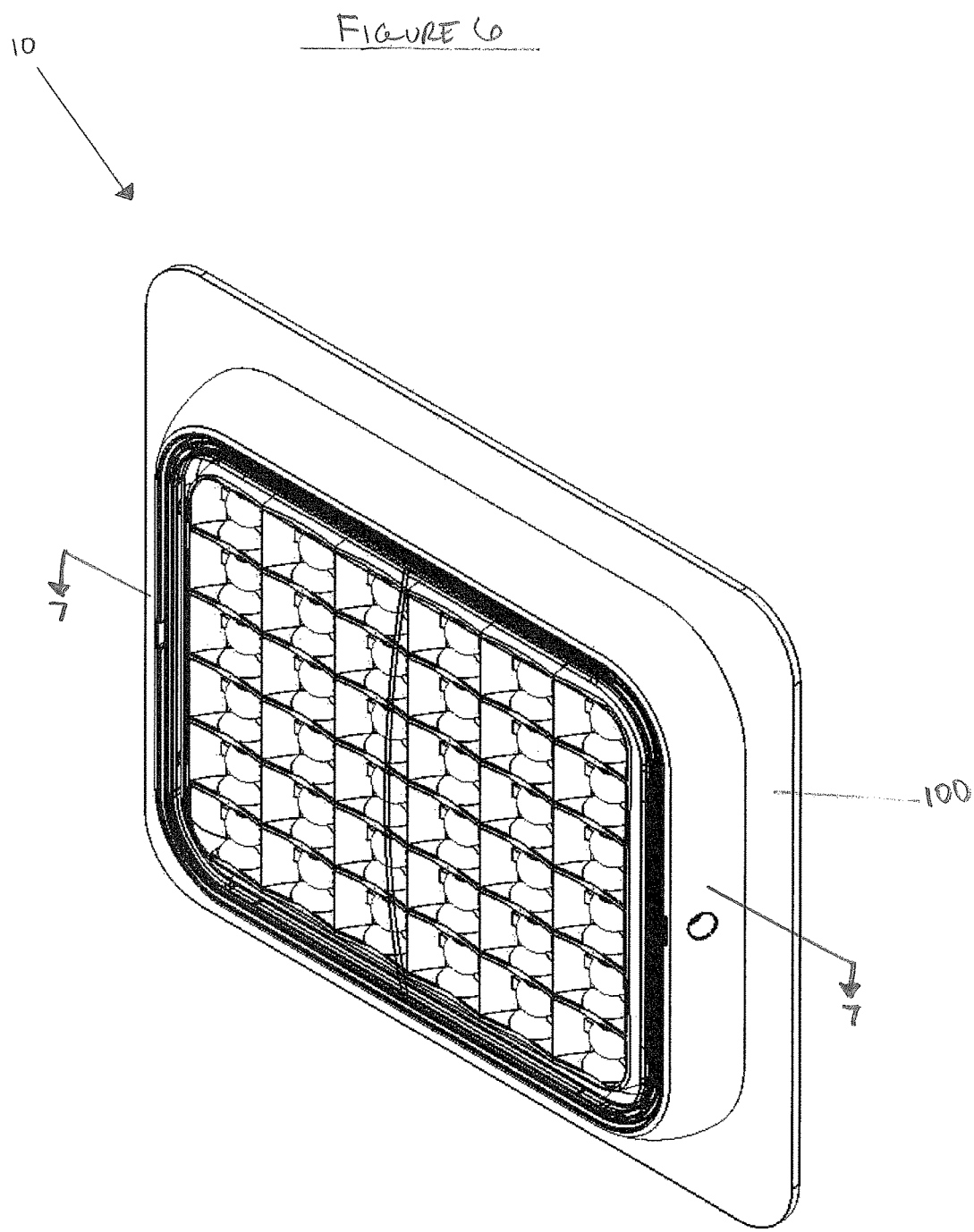
FIG. 6 shows a perspective view of the system of FIG. 1 mounted to a surface.

The lighthead 12 is inserted through a front side of the bezel 30. The lighthead 12 is pushed through the bezel 30 until the ramps 47 of the reflector 40 snap into the ledges 35 of the bezel 30. The series of tabs 37 of the bezel 30 fit into the series of recesses 51 of the reflector 30, attaching the bezel 30 to the reflector 40. The assembled lighthead 12 and bezel 30 are aligned with and positioned over the frame 50, then advanced toward the mounting surface 100. The barb 65 of each latch 64 snaps into and projects outward through each hook 45 of the accessory body (reflector 40). When each latch 64 projects outward through each hook 45, the lighthead 12 and bezel 30 are latched to the frame 50. When the lighthead 12, bezel 30 and the frame 50 are engaged, the keyhole-shaped openings 41 in the reflector 40 and the openings of the bezel 31 are aligned with the openings 60 defined by the each boss 62 between the latches 64. As shown in FIGS. 1 and 6, a fastener 110 is inserted through the openings (31, 41) and received by the opening 60 in each boss 62 of the frame 50. The fasteners 110 pull and hold each latch 64 in an engaged position. In the disclosed embodiment, the fasteners 110 are screws.

To release the engagement of the lighthead 12/bezel 30 from the frame 50, the fasteners 110 are removed and a tool (not shown), such as a flat blade screwdriver, is inserted in through the keyhole-shaped opening 41. The keyhole-shaped opening 41 allows the blade of the screwdriver to access the boss 62 between the latches 64. Inward force applied to the tool and boss 62 moves the latches 64 out of engagement with the hooks 45. When the latches 64 are in a retracted position, the frame 50 and the lighthead 12 are no longer engaged.

What is claimed:

1. A mounting system for securing accessories to a surface, said mounting system comprising:
 a frame including a base having a peripheral edge, at least one latch moveable between a projected and a retracted position, said latch including an arm originating at a root integral to said frame and a barb at an outer end of said arm, said arm including a boss adjacent said barb and defining a first opening;
 an accessory body configured to mate with said frame, said accessory body including at least one hook configured to mate with said latch, said barb projecting through said hook when said latch is in said projected position, said accessory body defining a second opening; and
 a fastener extending through said second opening to penetrate said first opening, said fastener holding said latch in the projected position engaging said hook to retain said accessory body to said frame in a fixed position.

2. The mounting system of claim 1, wherein there is a second latch and said boss defining the opening is centered between the first latch and the second latch.

3. The mounting system of claim 2, wherein said accessory body includes a second hook configured to mate with said second latch and the second opening is centered between the first hook and the second hook.

4. The mounting system of claim 1, wherein said accessory body and said frame are configured as a closed polygon having at least one pair of opposed sides, each of said opposed sides of said frame including a latch and each of said opposed sides of said accessory body having a complementary hook, and a fastener extending through said accessory body to engage said hook to retain said latch in said projected position.

5. The mounting system of claim 1, wherein said frame includes an interior edge offset from said peripheral edge and defining a plurality of holes for receiving a plurality of protrusions extending from a rear gasket between said interior edge and said peripheral edge.

6. The mounting system of claim 1, wherein said second opening is configured to allow access by a tool to release the latch from said projected position back to said retracted position.

7. The mounting system of claim 1, wherein said hook defines a slot, said frame inserts into said accessory body, and said latch projects outward through said slot to establish an engagement of said frame and said accessory body.

8. The mounting system of claim 7, wherein said frame is circumscribed within said accessory body when in said engagement.

9. A mounting system for a lighthead, said mounting system comprising:
 a lighthead body incorporating a hook or a latch integral to said lighthead body, said hook or latch including a first opening;
 a frame configured for mounting to a support structure, said frame incorporating a latch or hook including an arm originating at a root integral to said frame and a barb at an outer end of said arm, said latch or hook on said frame configured to mate with the hook or latch on said lighthead body, said arm of said latch or hook on said frame including a fastener-receiving boss adjacent said barb and defining a second opening,
 wherein said lighthead body is secured to said frame by engagement of said hook or latch on said lighthead body with the latch or hook on said frame, said barb of the latch or hook on said frame projecting through said hook or latch on said lighthead body, and a fastener passes through said first opening and is received by said boss to engage said latch or hook on said frame to maintain said engagement.

10. The mounting system of claim 9, wherein said frame inserts into said lighthead body and said latch or hook projects outward transversely through said hook or latch to establish an engagement of said frame and said lighthead body.

11. The mounting system of claim 10, wherein said engagement of said lighthead body and said frame aligns said second opening and said boss.

12. The mounting system of claim 9, wherein said second opening in said lighthead body is keyhole-shaped.

13. A method of constructing a mounting system, said method comprising:
 providing a frame including a base having a peripheral edge, a latch including an arm originating at a root integral to said frame and a barb at an outer end of said arm, said latch moveable between a projected and a retracted position, said arm including a boss adjacent said barb and defining a first opening;
 providing an accessory body including a hook configured to mate with said latch, said barb projecting through said hook when said latch is in said projected position, said accessory body defining a second opening adjacent said hook;
 mating said accessory body with said frame such that said latch projects through said hook and said first and second openings are aligned; and
 inserting a fastener through said second opening to penetrate the first opening in the frame, said fastener received by said boss and holding said latch in the projected position through said hook to maintain said accessory body and said frame in a fixed relationship.

14. The method of constructing a mounting system of claim 13, wherein said step of providing a frame includes said latch comprising an arm originating at a root integral to said frame and a barb adjacent an outer end of said arm, said arm including a boss adjacent said barb and boss defining the first opening.

15. The method of constructing a mounting system of claim 14, wherein said step of providing a frame includes said frame having a second latch and said boss defining the first opening is centered between said first latch and said second latch.

16. The method of constructing a mounting system of claim 15, wherein said step of providing an accessory body configured to mate with said frame includes a second hook mating with said second latch and said second opening is centered between said first hook and said second hook.

17. The method of constructing a mounting system of claim 13, wherein said step of mating said accessory body with said frame includes said hook defining a slot and said frame inserting into said accessory body such that said latch projects outward through said slot.

18. The mounting system of claim 1, wherein said latch is inserted transversely through said hook in said projected position.

19. The mounting system of claim 1, wherein said latch includes an arm originating at a root integral to said frame.

* * * * *